(12) United States Patent
Bonanno

(10) Patent No.: US 11,168,806 B2
(45) Date of Patent: Nov. 9, 2021

(54) BYPASS VALVE PISTON SEAL ARRANGEMENT

(71) Applicant: CPT GROUP GmbH, Hannover (DE)

(72) Inventor: Rosario Bonanno, Bad Soden (DE)

(73) Assignee: Vitesco Technologies GmbH, Hannover (DE)

( * ) Notice: Subject to any disclaimer, the term of this patent is extended or adjusted under 35 U.S.C. 154(b) by 48 days.

(21) Appl. No.: 16/471,802

(22) PCT Filed: Dec. 19, 2017

(86) PCT No.: PCT/EP2017/083510
§ 371 (c)(1),
(2) Date: Jun. 20, 2019

(87) PCT Pub. No.: WO2018/114927
PCT Pub. Date: Jun. 28, 2018

(65) Prior Publication Data
US 2020/0116273 A1   Apr. 16, 2020

(30) Foreign Application Priority Data
Dec. 22, 2016   (DE) .................... 10 2016 226 071.5

(51) Int. Cl.
| | |
|---|---|
| *F16K 25/00* | (2006.01) |
| *F16J 15/3204* | (2016.01) |
| *F16K 31/06* | (2006.01) |
| *F16K 1/34* | (2006.01) |
| *F02B 37/16* | (2006.01) |

(52) U.S. Cl.
CPC ............ *F16K 31/0655* (2013.01); *F16K 1/34* (2013.01); *F16K 25/005* (2013.01); *F02B 37/16* (2013.01); *F16J 15/3204* (2013.01)

(58) Field of Classification Search
CPC ...... F16K 1/34; F16K 25/005; F16K 31/0655; F16K 31/0686; F16J 15/3204; F02B 37/16
See application file for complete search history.

(56) References Cited

U.S. PATENT DOCUMENTS 3,866,925 A * 2/1975 Maimstrom ......... F16J 15/3456
277/618
3,930,684 A * 1/1976 Lasch, Jr. ........... H01L 21/6779
406/12

(Continued)

FOREIGN PATENT DOCUMENTS

| CN | 2403953 Y | 11/2000 |
|---|---|---|
| CN | 105637193 | 6/2016 |

(Continued)

OTHER PUBLICATIONS

International Search Report issued in corresponding PCT application No. PCT/EP2017/083510.

(Continued)

*Primary Examiner* — Matthew W Jellett
(74) *Attorney, Agent, or Firm* — Cozen O'Connor

(57) ABSTRACT

A valve includes a housing, a solenoid arranged in the housing, a pin movable by the solenoid, a piston connected to the pin, and a seal arranged between the housing and the piston. The seal is an axially acting seal which, in the closed state of the valve, interacts with a sealing surface of the piston.

7 Claims, 2 Drawing Sheets

(56) References Cited

U.S. PATENT DOCUMENTS

| | | | | |
|---|---|---|---|---|
| 4,945,945 | A | * | 8/1990 | Schmid ................ F16K 15/04 137/512 |
| 4,984,812 | A | * | 1/1991 | Wada .................. F02G 1/053 277/560 |
| 5,018,749 | A | * | 5/1991 | Forch ................ F16J 15/3456 277/387 |
| 8,387,383 | B2 | * | 3/2013 | Thiery ................ F02B 37/16 60/611 |
| 9,970,398 | B2 | * | 5/2018 | Fujino ................ F16K 31/0655 |

FOREIGN PATENT DOCUMENTS

| | | | | |
|---|---|---|---|---|
| DE | 10 2007 002 432 | | 6/2008 | |
| DE | 10 2008 031 738 | | 1/2010 | |
| DE | 102008031738 | A1 * | 1/2010 | ........... F16K 27/029 |
| DE | 10 2005 028 141 | | 3/2013 | |
| DE | 10 2011 054 003 | | 3/2013 | |
| DE | 10 2013 220 740 | | 4/2015 | |
| DE | 10 2014 113 540 | | 2/2016 | |
| DE | 10 2014 113 550 | | 3/2016 | |
| DE | 10 2014 226 885 | | 6/2016 | |
| WO | WO 2006/029184 | | 3/2006 | |
| WO | WO 2014/068765 | | 5/2014 | |
| WO | WO 2014/087478 | | 6/2014 | |
| WO | WO 2016/041659 | | 3/2016 | |
| WO | WO 2016/162968 | | 10/2016 | |

OTHER PUBLICATIONS

Written Opinion issued in corresponding PCT application No. PCT/EP2017/083510.

German Office Action issued in corresponding German Application No. 10 2016 226 071.5.

Office Action dated Jun. 23, 2020 issued in Korean Patent Application No. 10-2019-7020644.

* cited by examiner

BYPASS VALVE PISTON SEAL ARRANGEMENT

CROSS REFERENCE TO RELATED APPLICATIONS

This is a U.S. national stage of International application No. PCT/EP2017/083510, filed on Dec. 19, 2017, which claims priority to German Application No. 10 2016 226 071.5, filed Dec. 22, 2016, the content of which are incorporated herein by reference.

BACKGROUND OF THE INVENTION

1. Field of the Invention

The invention relates to a valve of a type having a housing, a solenoid arranged in the housing, a pin movable by the solenoid, and a piston connected to the pin, and a seal arranged between the housing and the piston.

2. Description of the Prior Art

Such valves are used, inter alia, as a diverter valve on the turbocharger in motor vehicles to open up a bypass to the suction side in overrun operation, and are thus known. In order to prevent excessive deceleration of the turbocharger, but also to ensure a fast launch, fast opening and closing of the valve is essential.

In particular during the closing process, immediate closure as a result of the abutment of the piston against a valve seat is of importance. The valve seat is formed by the housing of the turbocharger, on which the valve is flange-mounted. In addition, the axially displaceable piston must be sealed against the housing. For this purpose, it is known to arrange a V-shaped seal in the housing, the limbs of which bear in each case against the housing and against the lateral surface of the piston. The sealing action is achieved by the preload of the two limbs. This is disadvantageous in that the sealing lip, bearing against the piston, of one limb is subjected to friction due to the piston movement during the opening and closing, resulting in increased wear.

SUMMARY OF THE INVENTION

It is therefore an object of the invention to provide a valve with an improved sealing function.

This object may be achieved, according to an aspect of the invention, if the seal is an axially acting seal which, in the closed state of the valve, interacts with a sealing surface of the piston.

With the arrangement of an axially acting seal that interacts with the piston only in the closed state, it is achieved that the contact of seal and piston is limited to a period of time in which the piston is at rest, including a period of time immediately before the piston comes to rest. This means that the piston and seal make contact already shortly before the closed position. With the final movement of the piston into the closed position, the seal is deformed such that the sealing surfaces are preloaded against one another. With the axially acting seal, the seal is thus prevented from being in contact with the piston, and being subject to associated friction, during the movement of the piston during the opening and closing processes. Friction-induced wear is thus prevented, and the service life of the seal is improved.

Contact of seal and piston is reliably prevented if the sealing surface on the piston has a larger diameter than the lateral surface of the piston. By this refinement, the piston-side sealing surface of the seal can likewise be configured with a larger diameter than the lateral surface of the piston.

The piston can be configured with a form that is easy to manufacture, and thus inexpensive, if the sealing surface of the piston is arranged on the side of the piston that faces toward the solenoid.

In a particularly advantageous refinement, the sealing surface of the piston is a radially outwardly projecting edge.

The axially acting seal has the advantage that it can interact both with metallic pistons and with pistons made of plastic.

In the case of a metallic piston being used, the radially outwardly projecting edge can be produced particularly easily by deep-drawing of the piston and thus without an additional working step. It is however also conceivable for the edge to be produced by flanging of the side of the piston that faces toward the solenoid. Such an additional working step requires only a small outlay.

In a piston composed of plastic, the radially projecting edge can be provided without additional outlay if it is generated during the injection molding of the piston.

In one advantageous refinement, the seal is made of a polytetrafluoroethylene (PTFE). This material is easy to process and is characterized by low friction resistance.

In a further advantageous refinement, the seal has a housing-side sealing surface and a piston-side sealing surface, wherein the two sealing surfaces are connected by an elastically deformable region. The deformation of the elastic region in the closed position of the valve gives rise to a preload under which the sealing surfaces of the seal bear against the housing and against the piston, which increases the sealing action.

According to another advantageous refinement, the seal is particularly simple and inexpensive if the elastically deformable region spaces the two sealing surfaces apart from one another in the radial and axial directions. In the simplest case, the elastic region may be of rectilinear form with respect to the cross section of the seal. The preload of the sealing surfaces with respect to the respectively adjacent components can be adjusted within wide limits by the configuration of the elastic region. It is thus possible for the elastic region to have either a constant or a variable cross-sectional area. The length of the elastic region is likewise suitable for influencing the preload. It is however also possible for the preload to be set in targeted fashion by the angle at which the elastic region connects the two sealing surfaces of the seal.

Contact of piston and seal is reliably prevented if the inner diameter of the seal is greater than the outer diameter of that region of the lateral surface of the piston that is moved past the seal during the movement of the piston. In this way, dimensional changes of the individual parts of the valve due to temperature increases do not lead to contact of piston and seal during the opening or closing.

BRIEF DESCRIPTION OF THE DRAWINGS

The invention will be described in more detail on the basis of an exemplary embodiment. In the figures.

DETAILED DESCRIPTION OF THE PRESENTLY PREFERRED EMBODIMENTS

Figure 1:
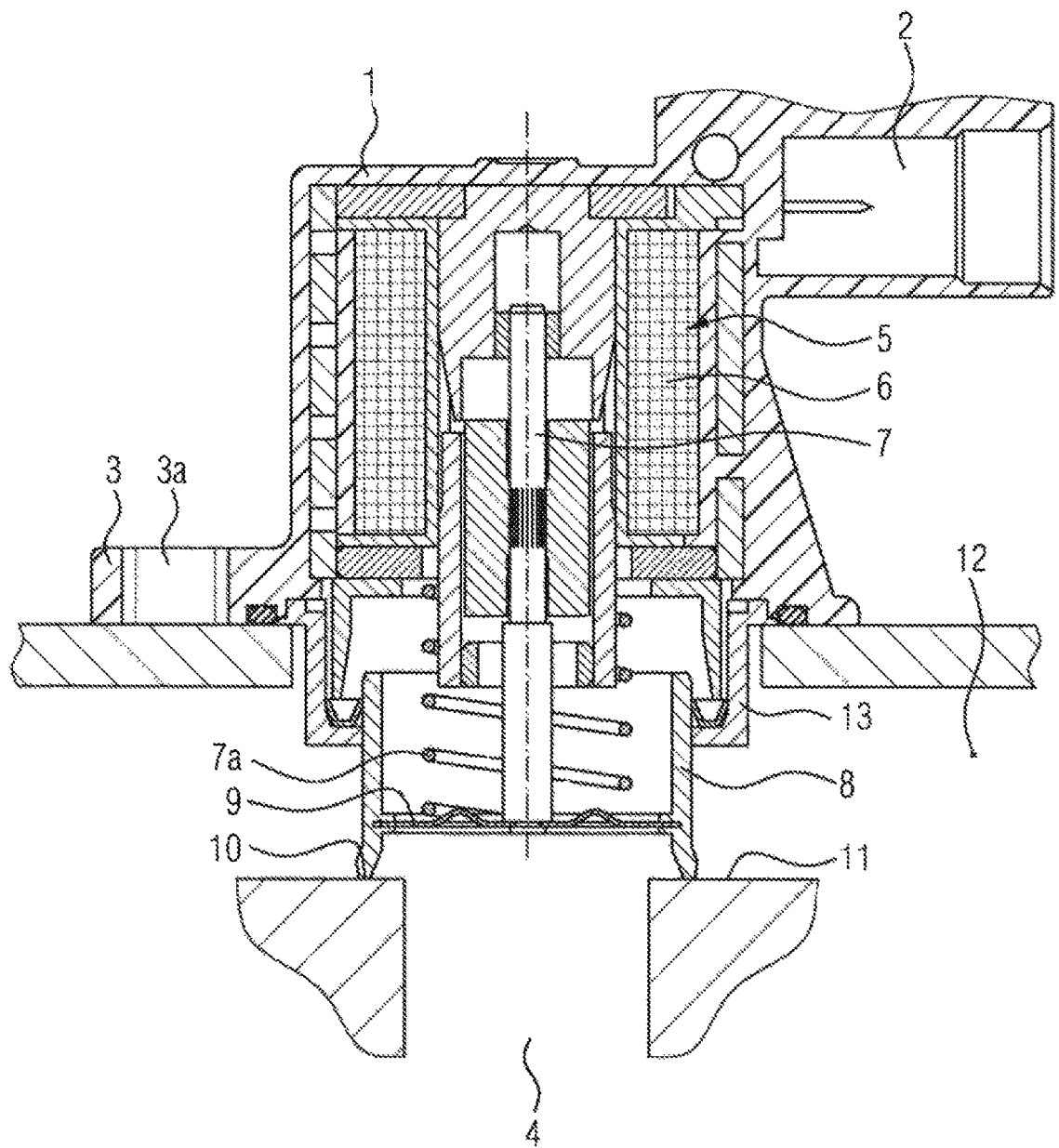
FIG. 1 is a sectional illustration of a valve according to the prior art.

FIG. 1 shows a valve comprising a housing 1 with integrally molded socket 2 for the electrical connection of the valve. The housing 1 furthermore has an integrally formed flange 3 and three bores 3*a*, by which the housing 1 is flange-mounted on a turbocharger (not illustrated) in the region of the bypass line 4. In the installed position shown, the flange 3 is adjoined by a housing bushing 13. In the housing 1, there is arranged a solenoid 5 with a coil 6 and a metal pin 7. The metal pin 7 is connected to a pot-shaped piston 8, which, at the circumference of its base 9, has an axially projecting annular sealing surface 10. In the closed position shown, the sealing surface 10 bears against the valve seat 11 in order to close off the bypass line 4, so that no medium can flow from the line 4 into the line 12. Here, a spring 7*a* pushes the piston 8 in the direction of the valve seat 11. The force generated by the spring 7*a* is counteracted by the force that acts on the base 9 owing to the pressure in the line 12.

Figure 2:
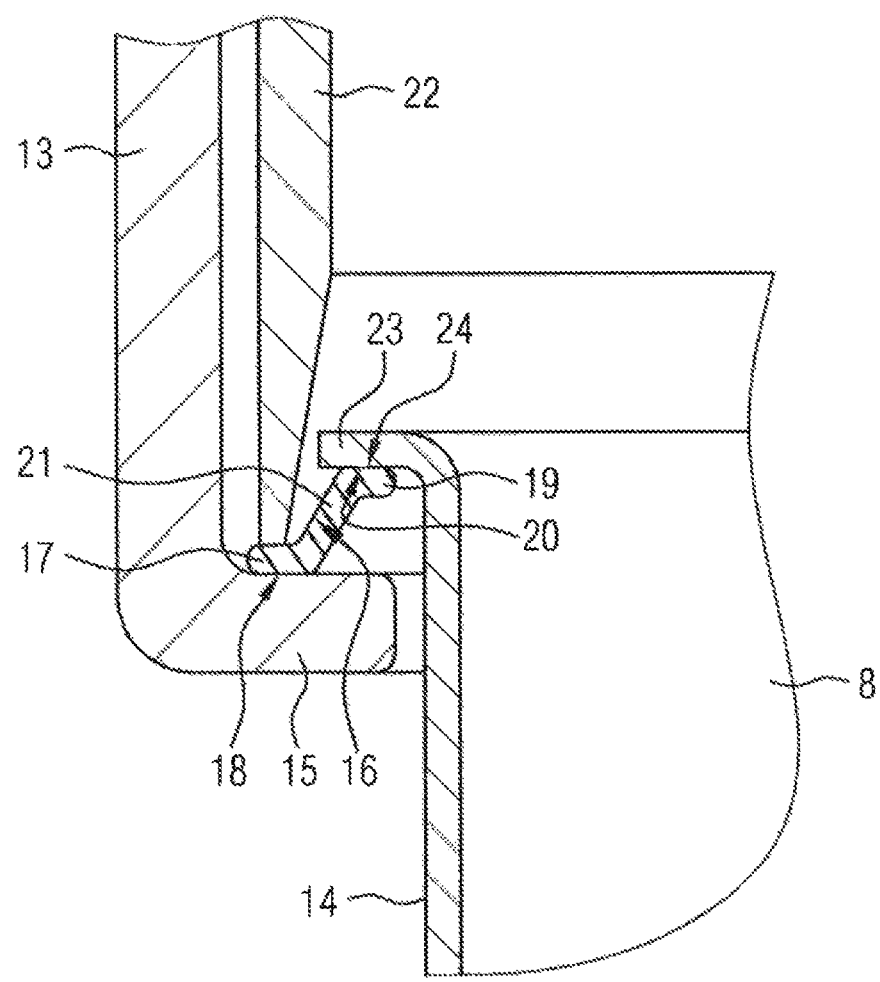
FIG. 2 is an enlarged illustration of the piston of a valve according to an embodiment of the invention in the sealing region.

FIG. 2 shows that region of the piston 8 which faces toward the housing 1, with its cylindrical lateral surface 14, in a closed position. The housing bushing 13 has a radially inwardly pointing collar 15. A seal 16 lies on the collar 15. The seal 16 has a region 17 with a housing-side sealing surface 18 and a region 19 with a piston-side sealing surface 20. The regions 17, 19 and thus the sealing surfaces 18, 20 are connected by an elastically deformable region 21. The housing-side region 17 is clamped between the collar 15 and a cylinder 22 arranged in the housing bushing 13, such that the seal 16 is arranged fixedly in the housing bushing 13. The piston 8, which is made of metal, has, at its open end, a radially outwardly projecting edge 23 which is produced by flanging and which has a sealing surface 24. During the closing of the piston 8, the sealing surface 24 moves downward.

Immediately before the closed position is reached, the sealing surface 24 of the piston 8 comes into contact with the sealing surface 20 of the seal 16. During the further movement of the piston 8 into the closed position, the sealing surface 24 presses against the sealing surface 20, which leads to a deformation of the elastic region 21. As a result of this deformation, a preload of the two sealing surfaces 24, 20 is realized. Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:
a housing (1);
a solenoid (5) arranged in the housing (1);
a pin (7) movable by the solenoid (5);
a piston (8) connected to the pin (7) and having a sealing surface (24) having a first diameter; and
a seal (16) arranged between the housing and piston,
wherein the seal (16) is an axially acting seal which, in a closed state of the valve, interacts with the sealing surface (24) of the piston (8),
wherein the seal (16) has a housing-side sealing surface (18) and a piston-side sealing surface (20) that are connected to one another by an angular elastically deformable region (21), and
wherein the angular elastically deformable region (21) is defined by parallel diagonal surfaces, the angular elastically deformable region (21) being configured to space the housing-side sealing surface (18) and the piston-side sealing surface (20) apart from one another in both the radial and the axial directions.

2. The valve as claimed in claim 1, wherein piston (8) comprises a lateral surface (14), the lateral surface (14) of the piston (8) having a second diameter that is smaller than the first diameter of the sealing surface (24) of the piston (8).

3. The valve as claimed in claim 2, wherein the sealing surface (24) of the piston (8) is part of a radially outwardly projecting edge (23) at an upper portion of the lateral surface (14).

4. The valve as claimed in claim 1, wherein the piston (8) is made of one selected from the group of metal and plastic.

5. The valve as claimed in claim 3, wherein the piston (8) is made of metal, and the radially outwardly projecting edge (23) of the piston (8) is produced by deep drawing of the piston (8) or by flanging of the side of the piston (8) that faces toward the solenoid (5).

6. The valve as claimed in claim 1, wherein the seal (16) is made of Polytetrafluoroethylene (PTFE).

7. The valve as claimed in claim 1, wherein an inner diameter of the seal (16) is greater than an outer diameter of a region of the lateral surface (14) of the piston (8) that is moved past the seal (16) during the movement of the piston (8).

* * * * *